Patented Jan. 16, 1934

1,943,916

UNITED STATES PATENT OFFICE 1,943,916

PROCESS FOR THE PRODUCTION OF METALLIC MAGNESIUM

Alfred Claude Jessup, Broadway, and Maurice Noel Lacell, London, England

No Drawing. Application October 31, 1932
Serial No. 640,572

17 Claims. (Cl. 204—19)

The present application is in large part, a continuation of matter disclosed in a copending case Ser. No. 177,225, filed March 21, 1927, corresponding to an application for patent in France filed March 26, 1926.

This invention relates to a process for the preparation of metallic magnesium.

The known processes (illustrated for example in Patent 1,539,654, Ashcroft) for the preparation of metallic magnesium usually employ the following sequence of operations:

The anhydrous chloride of magnesium is electrolyzed in a molten state and the chlorine coming from the electrolytic cells is brought into contact with a suspension of magnesia in water, so that from the oxide of magnesium, chloride of magnesium and chlorate of magnesium are formed simultaneously.

The chloride of magnesium is then separated from the chlorate by crystallization, and the crystals of the chloride, after dehydration, are electrolyzed in the molten state.

In practice, when it is desired to work with large quantities of material, the chlorate produced represents a great loss of chlorine and magnesia.

It has been proposed to produce magnesium chloride starting with magnesia, by the action of carbon tetrachloride which by liberating carbon oxychloride also reacts upon the magnesia.

Hydrated chloride or oxychloride of magnesium, however obtained, can be completely dehydrated in the presence of gaseous hydrochloric acid, as is well known, provided that the temperatures and partial pressures of the reacting gases are properly controlled. It has hitherto been the universal practice to carry out this dehydration, which is essential in order to obtain a satisfactory energy efficiency and a good yield in the electrolytic step, by means of hydrochloric acid added to the system from extraneous sources. This again entails great additional expense.

The object of the present invention is a new process for the preparation of magnesium which permits all formation of chlorate to be avoided, and if desired allows the dehydration to be carried out by means of hydrochloric acid generated from the chlorine evolved from the electrolytic cells and reused in the cycle for the attack of the raw material, thus effecting a great saving of expense under both the foregoing heads.

The present invention consists essentially in transforming the chlorine evolved from the cells into hydrochloric acid, and then causing the hydrochloric acid formed to react upon oxide of magnesium, carbonate of magnesium (magnesite), or any other basic oxygen-containing compound of the said metal, so that only chloride of magnesium is formed to the exclusion of chlorate.

This fundamental cycle may be completed, as stated above, by utilizing all or part of the hydrochloric acid formed for the dehydration of the hydrated or partially hydrated magnesium chloride to be subsequently employed for the electrolysis, the hydrochloric acid charged with water recovered at the end of the drying operation being utilized for the attack of the raw material and thus reintroduced into the cycle.

The transformation of chlorine into hydrochloric acid however presents considerable difficulties. The conversion of the chlorine must be complete, or otherwise some chlorate will be formed which may subsequently tend to decompose in acid solution and cause chlorine fumes to be emitted to the great prejudice of the surrounding neighbourhood. The hydrochloric acid obtained must further be sufficiently concentrated to effect the dehydration of the magnesium chloride easily and readily, and must therefore be accompanied by as small a volume as possible of extraneous gases. Lastly the means to obtain this end must be as economical as can be designed.

It is possible to unite the chlorine evolved from the electrolytic cells directly with hydrogen, where this is available; but in general the preparation of the hydrogen gas required is a costly operation, and it is extremely difficult so to control the proportions of the chlorine and the hydrogen as not to have an excess of one or other gas. An excess of chlorine will cause the formation of chlorate and give rise to grave danger of chlorine fumes being emitted into the atmosphere surrounding the works, as has already been explained. On the other hand an excess of hydrogen will cause grave risk of serious explosions. Moreover the oxygen in the air drawn from the electrolytic cells, whose presence it is impracticable to obviate completely, will cause additional dangers of explosion.

It is also possible to mix the chlorine coming from the electrolytic cells with a sufficient volume of oxygen, or to allow it to come from the electrolytic cells already accompanied by a sufficient volume of air, to form carbon oxychloride when passed over a suitable carbonaceous material at the requisite temperature. Upon subsequent treatment with water the carbon oxychloride is decomposed into hydrochloric acid and carbon dioxide, and the gases so formed are used for the dehydration of the magnesium chloride. This method however also has disadvantages which militate against its successful employment. Carbon oxychloride or phosgene, is a most poisonous gas, in fact the most poisonous gas in very minute quantities which science has so far prepared, and its effects are, unlike most other toxic gases containing the chlorine radicle, in the highest degree cumulative on the human system. The escape of very small quantities will therefore be highly dangerous to those employed in the works. Further if the chlorine is admixed with sufficient air to supply the oxygen necessary for the formation of phosgene, this air will carry with it a corresponding fourfold volume of nitrogen which will greatly dilute the resulting hydrochloric acid gas and thus render it less suitable for use in the subsequent dehydration of the magnesium chloride. If on the other hand pure oxygen be used for the formation of the phosgene, this will entail considerable additional expense.

All these difficulties can however be overcome by allowing the formation of phosgene to take place by means of the reaction between carbon and water or water vapour, in the same reaction chamber where its simultaneous and instantaneous decomposition is effected by means of the excess water or water vapour present, to form hydrochloric acid and oxides of carbon. It has indeed long been known that at temperatures superior to 200° C. water or water vapour will react upon carbon in the presence of chlorine with formation of hydrochloric acid and oxides of carbon. In this case the phosgene is destroyed as it is formed, in the nascent state and instantaneously, by the excess of water, and some of the carbon dioxide is subsequently reduced to carbon monoxide by the excess of carbon present. The chemical reactions may be written as follows:

(a) $C + 2Cl_2 + H_2O = COCl_2 + 2HCl$
(b) $COCl_2 + H_2O = CO_2 + 2HCl$

Combining the two reactions which take place simultaneously, the complete reaction can be represented by the following:

(c) $C + 2Cl_2 + 2H_2O = CO_2 + 4HCl$

Some of the $CO_2$ is then reduced to CO according to the equation:

(d) $CO_2 + C = 2CO$

The proportion of the $CO_2$ thus reduced naturally increases with elevation of temperature. The carbon monoxide formed has no effect upon the subsequent reactions of the cycle, and the same is true of the carbon dioxide.

The above method, described by the chemical reactions cited, has never before been used for the conversion of chlorine evolved from electrolytic cells into hydrochloric acid, and its application to a cyclic process for the utilization as hydrochloric acid of the chlorine liberated by the electrolysis of fused magnesium chloride forms the essential basis of my invention, as it gives the easiest and most efficient way of carrying out the desired step in the cycle.

The inventor has further found that if the reaction is conducted at too low a temperature, the reaction will either not be integral in character with the result that unconverted chlorine will accompany the hydrochloric acid, giving rise to the dangers and inconveniences already described; or that if the reaction is to be made complete and integral at so low a temperature, so large an excess of water must be employed that the resultant hydrochloric acid leaves the reaction chamber so saturated with moisture as to cause great difficulty in its subsequent utilization for the dehydration of the magnesium chloride, more especially if the moisture is to be removed by condensing out a concentrated hydrochloric acid solution without subsequently distilling the same, which is the simplest and one of the most efficient ways of removing it.

On the other hand the inventor has also found that if the temperature of the reaction is allowed to rise too high, the ash of the carbonaceous material employed as the source of carbon will fuse. This will tend to completely block up the draught on the cells, with the result that the whole cycle immediately becomes inoperative. The cell gases will be unable to pass the convertor, and the chlorine will escape from the cells causing great loss of material to the cycle and grave danger to the men operating the electrolytic cells.

The inventor has further found that if water be used alone for the reaction in question, the temperature is too low in that either the chlorine is not completely converted or the hydrochloric acid gas formed is too much saturated with moisture; while if steam be used alone for the reaction, the temperature may go too high, so that the ash of the carbonaceous material employed fuses and blocks the free passage of the gases through the convertor. If however, a mixture of water and steam be employed for the reaction, the temperature will in general be of the right order of magnitude, in that an integral conversion of the chlorine will be effected when using only a small excess of $H_2O$, and the ash of the carbonaceous material will remain unfused. Further by suitably grading the relative proportions of water and steam, any desired optimum temperature may be maintained according to the carbonaceous material chosen: coke, wood, charcoal, etc., of different compositions and sizes.

The inventor has in general found that the optimum temperatures for the above reaction lie between 300° C. and 800° C. It should however be understood that the limits may vary widely, according to the nature, quality, composition and size of the carbonaceous material employed, and that therefore the temperatures given above should be construed in no way in a limitative sense. What is important is that the optimum temperature should be correctly determined for whatever carbonaceous material is chosen for economic or technical reasons, and that this temperature should be maintained by means of accurately grading the relative proportions of water and steam to the construction of the convertor as designed.

It is of course necessary to start the reaction by charging the convertor with carbonaceous material previously heated, but once the reaction is started and well under way, the heat evolved by the reaction maintains the temperature.

It should also be emphasized that as little air as possible should be drawn off from the electrolytic cells together with the chlorine, for such air will by reason of the oxygen it contains uselessly consume carbonaceous material, thereby engendering an economic loss; and the resulting combustion will in turn tend to raise the temperature of the reaction in the convertor, thereby causing danger of the ash fusing and blocking the free draught for the gases. Provided however the convertor be kept completely free from all blockage by means of operation between the chosen temperature interval, the draught on the cells can be kept sufficiently low for it to be a relatively easy matter to collect chlorine of sufficient concentration, if the covers of the electrolytic cells are sealed with reasonable efficiency in any of the known ways and by any of the usual structural devices. The exclusion of all air will however in general be impracticable if not impossible.

When the hydrochloric acid gas leaves the convertor, the problem of getting rid of the majority of the water vapour which it carries with it next presents itself. There are a number of different ways in which this may be effected. The easiest and most economical, provided that the conversion has been carried through as described above without employing an undue excess of water, is to condense out by refrigeration a saturated hydrochloric acid solution, which may represent, say 10% or 20% of the total hydrochloric acid formed, and to lead this small proportion of aqueous hydrochloric acid direct to the attack of the oxygen-containing compound of magnesium serving as raw material, while allowing the remaining 80 or 90% of the hydrochloric acid gas, now in a nearly anhydrous condition, to be used for the dehydration of the magnesium chloride requisite for the cycle. This hydrochloric acid gas, which is amply sufficient for the said dehydration, will in turn become charged with moisture, and is then also led to the attack, either after having previously refrigerated and condensed out an aqueous solution of hydrochloric acid, or without having passed through this preliminary step. The total hydrochloric acid, corresponding to the total chlorine evolved from the electrolytic cells, will therefore serve to react upon the raw material, while the water set free during the dehydration of the magnesium chloride together with the excess of that supplied for the conversion of the chlorine into hydrochloric acid, will form a portion of the total water necessary for the suspension, attack, and dissolution of the said oxygen-containing compound of magnesium.

If however too large an excess of water has been employed for the conversion, a part or the whole of the hydrochloric acid gas condensed may be distilled from its aqueous solution and used for the dehydration of the magnesium chloride.

The moist hydrochloric acid gas may also be led into cold concentrated sulphuric acid and subsequently distilled off, while the diluted sulphuric acid is afterwards reconcentrated. Or again the moist hydrochloric acid gas may be passed over a suitable drying agent, such as phosphorus pentoxide, or the chlorides of calcium or magnesium in an anhydrous or nearly anhydrous condition. It is however in all ways immaterial to the cycle what special means are adopted to remove the major portion of the moisture present in the hydrochloric acid gas as it leaves the convertor, provided that this step in the cycle be carried through in an efficient manner.

The term "acid-soluble basic magnesium compound" and like expressions are used hereinafter to embrace MgO, and hydrated MgO as well as $MgCO_3$ (which may, of course, be more or less completely decarbonated) and the like. These are "basic" in the sense that they can neutralize HCl.

We claim:

1. The cyclic process for the manufacture of magnesium by the electrolysis of fused magnesium chloride, which comprises the steps of bringing the chlorine which is liberated at the anode of the electrolytic cell into contact with a carbonaceous fuel at an elevated temperature, simultaneously adding hydrogen oxide to obtain hydrochloric acid gas, and causing the hydrochloric acid so obtained to react upon an acid-soluble oxygen-containing basic compound of magnesium for the purpose of producing magnesium chloride, which after dehydration is subjected to the electrolytic step.

2. The cyclic process for the manufacture of magnesium, which comprises electrolysis of fused magnesium chloride, bringing the chlorine which is liberated at the anode of the electrolytic cell into contact with a carbonaceous fuel at an elevated temperature, simultaneously adding water and steam to obtain hydrochloric acid gas while controlling the proportions of water and steam so as to maintain the temperature of reaction above that requisite for the substantially complete conversion of the chlorine into hydrochloric acid but below that at which the ash from the carbonaceous fuel would fuse, causing the hydrochloric acid so obtained to react upon an acid-soluble basic oxygen-containing compound of magnesium for the purpose of producing magnesium chloride, and subjecting said magnesium chloride to dehydration and then to electrolysis in the first mentioned step.

3. The cyclic process for the manufacture of magnesium by the electrolysis of fused magnesium chloride, which comprises bringing the chlorine liberated in said electrolysis into contact with hot carbonaceous fuel, simultaneously adding hydrogen oxide to obtain hydrochloric acid gas, bringing hydrochloric acid gas so formed into contact with a magnesium compound containing partially hydrated magnesium chloride for the dehydration of the latter, causing the hydrochloric acid to react upon an acid-soluble basic oxygen-containing compound of magnesium for the purpose of producing magnesium chloride, and after dehydration, bringing said magnesium chloride into the said electrolytic step.

4. The cyclic process for the manufacture of magnesium by the electrolysis of fused magnesium chloride, which comprises bringing the chlorine liberated into contact with hot carbonaceous fuel, simultaneously adding water and steam to obtain hydrochloric acid gas, controlling the proportions of water and steam so as to maintain the temperature of reaction above that requisite for the substantially complete conversion of the chlorine into hydrochloric acid but below that at which the ash from the carbonaceous material will fuse, bringing at least a part of the hydrochloric acid gas so formed into contact with a heated magnesium compound containing partially hydrated magnesium chloride which is being dehydrated and causing at least a part of the hydrochloric acid produced to react upon an acid-soluble basic oxygen-containing compound of magnesium for the purpose of producing magnesium chloride, which after dehydration is brought into the electrolytic step.

5. The cyclic process for the manufacture of magnesium by the electrolysis of fused magnesium chloride, which comprises bringing chlorine liberated in the said electrolysis, into contact with hot carbonaceous material, simultaneously adding hydrogen oxide in amount sufficient to produce hydrochloric acid gas, leading the hydrochloric acid gas so formed into contact with a magnesium compound containing partially hydrated magnesium chloride which is being dehydrated, and causing the hydrochloric acid after said dehydration step to react upon an acid-soluble basic oxygen-containing compound of magnesium for the purpose of producing magnesium chloride, which is passed first to the above mentioned dehydration step and then to the electrolytic step.

6. The cyclic process for the manufacture of magnesium by the electrolysis of fused magnesium chloride, which comprises bringing the chlorine liberated in the said electrolysis into contact with hot carbonaceous fuel, simultaneously adding water and steam to obtain hydrochloric acid gas, controlling the proportions of water and steam so as to maintain the temperature of reaction above that requisite for the substantially complete conversion of the chloride into hydrochloric acid but below that at which the ash from the carbonaceous material will fuse, utilizing the hydrochloric acid gas so formed for the dehydration of a magnesium compound containing partially hydrated magnesium chloride, and employing the hydrochloric acid after said dehydration step to react upon an acid-soluble oxygen-containing compound of magnesium for the purpose of producing magnesium chloride, which is passed first to the said dehydration step and then to the electrolytic step.

7. The cyclic process for the manufacture of magnesium by electrolysis of fused magnesium chloride, which comprises bringing the chlorine liberated in said electrolysis into contact with hot carbonaceous fuel, simultaneously adding hydrogen oxide to obtain hydrochloric acid gas, removing the major portion of the moisture from the hydrochloric acid so formed, passing the substantially dry gas so obtained into contact with a magnesium compound containing partially hydrated magnesium chloride which is being dehydrated, and causing the hydrochloric acid after said dehydration step to react upon an acid-soluble basic oxygen-containing compound of magnesium for the purpose of producing magnesium chloride, which after dehydration is passed to the electrolytic step.

8. The cyclic process for the manufacture of magnesium by electrolysis of fused magnesium chloride, which comprises bringing the chlorine liberated in said electrolysis, into contact with hot carbonaceous fuel, simultaneously adding water and steam to obtain hydrochloric acid gas, controlling the proportions of water and steam so as to maintain the temperature of reaction above that requisite for the substantially complete conversion of the chlorine into hydrochloric acid but below that at which the ash from the carbonaceous material will fuse, removing the major portion of the moisture from the hydrochloric acid gas so formed, passing the gas so obtained into contact with a magnesium compound containing partially hydrated magnesium chloride which is undergoing dehydration, and causing the hydrochloric acid after use in said dehydration step to react upon an acid-soluble basic oxygen-containing compound of magnesium for the purpose of producing magnesium chloride, which after dehydration is passed to the electrolytic step.

9. The cyclic process for the manufacture of magnesium by electrolysis of fused magnesium chloride, which comprises bringing the chlorine liberated in said electrolysis, into contact with hot carbonaceous fuel, simultaneously adding hydrogen oxide in amount sufficient to produce hydrochloric acid gas, removing the major portion of the moisture from the gas so obtained by refrigerating the same to condense out a concentrated solution of hydrochloric acid and distilling said acid to produce hydrochloric acid gas, utilizing the gas so formed for the dehydration of a magnesium compound containing partially hydrated magnesium chloride, and employing the hydrochloric acid after said refrigeration and dehydration steps to react upon an acid-soluble oxygen-containing compound of magnesium for the purpose of producing magnesium chloride, which after dehydration is used for the electrolytic step.

10. The cyclic process for the manufacture of magnesium by electrolysis of fused magnesium chloride, which comprises bringing the chlorine liberated into contact with hot carbonaceous material, simultaneously adding water and steam to obtain hydrochloric acid gas, controlling the proportions of water and steam so as to maintain the temperature of reaction above that requisite for the substantially complete conversion of the chloride into hydrochloric acid but below that at which the ash from the carbonaceous material will fuse, removing the major portion of the moisture from the hydrochloric acid gas so obtained by refrigerating the same to condense out a concentrated solution of hydrochloric acid and distilling said acid to produce hydrochloric acid gas, utilizing the gas so formed for the dehydration of a magnesium compound containing partially hydrated magnesium chloride, and employing the hydrochloric acid after said refrigeration and dehydration steps to react upon an acid-soluble oxygen-containing compound of magnesium for the purpose of producing magnesium chloride which after dehydration is used for the electrolytic step.

11. The cyclic process for the manufacture of magnesium by electrolysis of fused magnesium chloride, which comprises bringing the chlorine liberated into contact with hot carbonaceous material, simultaneously adding hydrogen oxide to obtain hydrochloric acid gas, removing the major portion of the moisture from the gas so obtained by passing it over a dehydrating agent, utilizing the gas so formed for the dehydration of a magnesium compound containing partially hydrated magnesium chloride, and employing the hydrochloric acid after said dehydration steps to react upon an acid-soluble oxygen-containing compound of magnesium for the purpose of producing magnesium chloride, which after dehydration is used for the electrolytic step.

12. The cyclic process for the manufacture of magnesium by electrolysis of fused magnesium chloride, which comprises bringing the chlorine liberated into contact with hot carbonaceous material, simultaneously adding a mixture of water and steam to obtain hydrochloric acid gas, controlling the proportions of water and steam so as to maintain the temperature of reaction above that requisite for the substantially complete conversion of the chlorine into hydrochloric acid but below that at which the ash from the carbonaceous material will fuse, removing the major portion of the moisture from the hydrochloric acid gas so obtained by passing it over a dehydrating agent, utilizing the gas so formed for the dehydration of a magnesium compound containing partially hydrated magnesium chloride, and employing the hydrochloric acid after said dehydration steps to react upon an acid-soluble oxygen-containing compound of magnesium for the purpose of producing magnesium chloride, which after dehydration is used for the electrolytic step.

13. The cyclic process for the manufacture of magnesium by electrolysis of fused magnesium chloride, which comprises bringing the chlorine liberated into contact with hot carbonaceous material, simultaneously adding hydrogen oxide to obtain hydrochloric acid gas, removing the major portion of the moisture from the gas so obtained by condensing the same and treating at least a part of the hydrochloric acid as is desired with concentrated sulphuric acid, heating the same to distill hydrochloric acid gas and subsequently reconcentrating the diluted sulphuric acid for reuse in the cycle, utilizing the gas so formed for the dehydration of a magnesium compound containing partially hydrated magnesium chloride, and employing the hydrochloric acid after said condensation and dehydration steps to react upon an acid-soluble oxygen-containing compound of magnesium for the purpose of producing magnesium chloride, which after dehydration is used for the electrolytic step.

14. The cyclic process for the manufacture of magnesium by electrolysis of fused magnesium chloride, which comprises bringing the chlorine liberated into contact with hot carbonaceous material, simultaneously adding water and steam to obtain hydrochloric acid gas, controlling the proportions of water and steams so as to maintain the temperature of reaction above that requisite for the substantially complete conversion of the chlorine into hydrochloric acid but below that at which the ash from the carbonaceous material will fuse, removing the major portion of the moisture from the hydrochloric acid gas so obtained by condensing the same and treating such portions of the hydrochloric acid as is desired with concentrated sulphuric acid, heating the same to distill hydrochloric acid gas and subsequently reconcentrating the diluted sulphuric acid for reuse in the cycle, utilizing the gas so formed for the dehydration of a magnesium compound containing partially hydrated magnesium chloride, and employing the hydrochloric acid after said condensation and dehydration steps to react upon an acid-soluble oxygen-containing compound of magnesium for the purpose of producing magnesium chloride, which after dehydration is used for the electrolytic step.

15. The cyclic process for the manufacture of magnesium by the electrolysis of fused magnesium chloride, which comprises bringing the chlorine liberated in said electrolysis into contact with hot carbonaceous fuel, simultaneously adding hydrogen oxide only in such amount as to obtain a hydrochloric acid gas mixture from which a relatively small proportion of the hydrochloric acid will condense as a solution on refrigeration, refrigerating said gas to produce such condensation, passing the gas still containing the major portion of the hydrochloric acid produced, after such refrigeration, into contact with a magnesium compound containing partially hydrated magnesium chloride during dehydration of the latter, and causing the hydrochloric acid from the dehydration and refrigeration steps to react upon an acid-soluble basic oxygen-containing compound of magnesium for the purpose of producing magnesium chloride, which after dehydration is passed to the electrolytic step.

16. The cyclic process for the manufacture of magnesium by electrolysis of fused magnesium chloride, which comprises bringing the chlorine liberated in the electrolysis, into contact with hot carbonaceous fuel, simultaneously adding water and steam only in such amounts as to obtain a hydrochloric acid gas mixture from which a relatively small proportion of the hydrochloric acid will condense as a solution on refrigeration, while so controlling the proportions of water and steam as to maintain the temperature of reaction above that requisite for the substantially complete conversion of the chlorine into hydrochloric acid but below that at which the ash from the carbonaceous material will fuse, cooling the exit gas containing hydrochloric acid to condense out water containing the said small portion of the hydrochloric acid, passing at least the major portion of the hydrochloric acid gas left after refrigeration in the form of gas, in contact with a magnesium compound containing partially hydrated magnesium chloride which is being dehydrated, and causing the hydrochloric acid from the dehydration and refrigeration steps to react upon an acid-soluble basic oxygen-containing compound of magnesium for the purpose of producing magnesium chloride, which after dehydration is passed to the electrolytic step.

17. The cyclic process for the manufacture of magnesium by electrolysis of fused magnesium chloride, which comprises bringing the chlorine liberated into contact with hot carbonaceous material, simultaneously adding water and steam only in such amount as to obtain a relatively small proportion of the hydrochloric acid as a solution on refrigeration, while so controlling the proportions of water and steam as to maintain the temperature of reaction above that requisite for the substantially complete conversion of the chlorine into hydrochloric acid but below that at which the ash from the carbonaceous material will fuse, utilizing the major portion of the hydrochloric acid obtained after refrigeration in the form of gas for the dehydration of a magnesium compound containing partially hydrated magnesium chloride, and reacting with the hydrochloric acid from the dehydration and refrigeration steps upon an acid-soluble oxygen-containing compound of magnesium to form magnesium chloride, which is passed first to the before mentioned dehydration step and then to the electrolytic step.

ALFRED CLAUDE JESSUP.
MAURICE NOEL LACELL.